United States Patent
Zhu et al.

(10) Patent No.: US 7,433,156 B2
(45) Date of Patent: Oct. 7, 2008

(54) FLEXURE FOR MINIMIZING FLY HEIGHT MODULATION OF NEAR-CONTACT RECORDING SLIDERS IN A DISK DRIVE

(75) Inventors: Li-Yan Zhu, San Jose, CA (US); Chao-Hui Yang, Milpitas, CA (US); Mannuel Hernandez, San Jose, CA (US); Yen Fu, San Jose, CA (US); Ellis Cha, San Ramon, CA (US)

(73) Assignee: SAE Magnetics (HK) Ltd., Shatin, N.T. (HK)

( * ) Notice: Subject to any disclaimer, the term of this patent is extended or adjusted under 35 U.S.C. 154(b) by 430 days.

(21) Appl. No.: 11/351,940

(22) Filed: Feb. 10, 2006

(65) Prior Publication Data
US 2007/0188927 A1 Aug. 16, 2007

(51) Int. Cl.
*G11B 5/48* (2006.01)
(52) U.S. Cl. .................................... 360/245.3; 360/245
(58) Field of Classification Search ................ 360/245, 360/245.1, 245.3, 245.6
See application file for complete search history.

(56) References Cited
U.S. PATENT DOCUMENTS

| | | | |
|---|---|---|---|
| 4,280,156 A | 7/1981 | Villette | |
| 4,399,476 A | 8/1983 | King | |
| 4,797,763 A | 1/1989 | Levy et al. | |
| 5,115,363 A | 5/1992 | Khan et al. | |
| 5,282,103 A * | 1/1994 | Hatch et al. | 360/245 |
| 5,568,332 A | 10/1996 | Khan | |
| 5,630,948 A | 5/1997 | Ueda et al. | |
| 5,659,448 A | 8/1997 | Shimizu et al. | |
| 6,351,348 B1 | 2/2002 | Erpelding et al. | |
| 6,392,842 B1 | 5/2002 | Boutaghou et al. | |
| 6,560,073 B1 | 5/2003 | Ohwe et al. | |
| 6,697,228 B1 * | 2/2004 | Mei et al. | 360/245.3 |
| 6,741,529 B1 | 5/2004 | Getreuer | |
| 6,992,862 B2 * | 1/2006 | Childers et al. | 360/245.3 |
| 2004/0231139 A1 | 11/2004 | Jurgenson | |
| 2005/0083610 A1 | 4/2005 | Ohwe et al. | |
| 2007/0159726 A1* | 7/2007 | Maslov et al. | 360/245.1 |

* cited by examiner

*Primary Examiner*—Brian E Miller
(74) *Attorney, Agent, or Firm*—Saile Ackerman LLC; Stephen B. Ackerman

(57) ABSTRACT

A flexure mounted slider and its method of fabrication is described, wherein the slider is affixed to a pair of highly compliant, transverse (to the longitudinal axis of a load beam) crossbars whose common axis passes directly above the center of percussion of the slider. The location of the center of percussion of the slider relative to the flexure eliminates translational motion of the slider during HDI events, but not twisting motion in a pitch direction during normal operation, and thereby minimizes the transfer of kinetic energy between the slider and the flexure during HDI events with a hard disk. The high compliance of the flexure crossbars to twists in a pitch direction, as well as the compliance of the outriggers to bending, allows the slider to pass over irregularities in the disk during normal operations.

35 Claims, 4 Drawing Sheets

FLEXURE FOR MINIMIZING FLY HEIGHT MODULATION OF NEAR-CONTACT RECORDING SLIDERS IN A DISK DRIVE

BACKGROUND OF THE INVENTION

1. Field of the Invention

This invention relates to the fabrication and use of flexure assemblies to support slider mounted read/write transducers in disk drives. More particularly, it relates to a flexure design that can be used advantageously in near-contact recording where the slider-disk interference (HDI) is intense.

2. Description of the Related Art

A hard disk drive (HDD) uses an encapsulated thin film magnetic read/write head (transducer), called a slider, to read and write data on a magnetic medium or storage disk. The slider has a pre-patterned air-bearing surface (ABS) and is mounted on a head gimbal assembly (HGA). The HGA is activated by a servo actuator and associated electronic control circuitry to position the slider at various target locations along the magnetically encoded tracks on the disk. As the disk is rapidly rotated by a spindle motor, hydrodynamic pressure causes an air flow between the ABS of the slider and the surface of the disk. This flow lifts the slider so that it literally flies above the surface of the disk (at a "fly height") on a layer of air. The edge of the slider into which the disk rotates is called its "leading edge," the opposite edge, which contains the read/write head is called the "trailing edge." The HGA also includes a flexible connection or flexure, between the slider and a load beam (suspension), allowing the slider pitch and roll capability when fly height is achieved. The flexure maintains the ABS of the slider substantially parallel to the surface of the disk. Early forms of this flexible suspension are disclosed in Levy et al. (U.S. Pat. No. 4,797,763), who, in the abstract, describes the slider as being "secured to the mounting arm by a small springy resilient sheet metal member, having a broad central area with a rounded protrusion intended to engage the outer transverse portion of the ring-shaped end of the mounting arm . . . ." The flexure thus enables the slider to pivot about a dimple (Levy's "rounded protrusion") on the load beam, with relatively low resistance. Other early disclosures of flexible slider mountings are found in Villette (U.S. Pat. No. 4,280,156) and King (U.S. Pat. No. 4,399,476).

Thus, thanks to developments in the gimbals and flexure, even despite manufacturing tolerances, the parallel positioning of the slider can be maintained. A more recent slider and HGA combination of this type is described in Khan et al. (U.S. Pat. No. 5,115,363). Khan teaches a gimbal-type flexure having a lateral cross band support member for flexibly coupling a slider mounted transducer to a load beam on the actuator arm of a hard disk drive. A novel feature of Khan et al. is that the slider mounts to the flexure at its mid-section rather than distally.

For discussion purposes, the angle between the slider ABS and the disk surface in a cross-section along the slider axis of symmetry, is called the pitch angle. The angle between the ABS and the disk surface in a cross-sectional plane perpendicular to the slider axis of symmetry is called the roll angle. It is known in the prior art that the slider fly height is affected by moments in pitch and roll directions. It is also known that high flexure stiffness in the radial direction (transverse to the data tracks the disk) is beneficial to maintaining accuracy of read/write head positioning during the accessing of a target track. Such stiffness requirements have been met by the so-called Watrous flexure (described in U.S. Pat. No. 5,568,332), on which the slider is mounted distally and which is widely used in the industry. If the sliders are to be repeatedly lifted within the disk drive during drive operation, the flexure must also provide a suitable pitch moment during lift. A "ring-gimbal" type flexure has been adopted for this purpose and is described in Villette, cited above.

A pre-load downward force applied by the suspension is used to counteract and control the hydrodynamic lifting force. The position above the disk at which the pre-load downward force and the hydrodynamic upward force are in equilibrium is the targeted fly height of the slider. When a predetermined rotational speed and targeted flying height are achieved, the writing and reading of data commences. As a consequence of higher linear and track densities, the flying height and thus the distance between the read/write head and the storage disk, must be extremely small to ensure accurate transfer of data.

It is known in the prior art that the flexure affects slider fly height modulation by affecting the various modes of HGA vibration. In particular, prior art attention has been focused on low frequency vibrational modes of the suspension, typically frequencies below 10 kHz, including the sway mode, the twist mode, and the bending mode. These modes are typically excited by turbulence in the air flow about the slider, as well as by the operation of the servo actuator and spindle motor bearing. Khan et al. (U.S. Pat. No. 5,115,363), already discussed above, discloses an HGA and flexure that has greatly increased compliance for pitch and roll of the slider and yet does not permit the mass of the slider to generate a moment about its mounting on the flexure. The flexure provided has a generally fork-shaped outer member with a low stiffness cross-bar formed between the outer prongs of the fork. The slider is mounted on the cross-bar. The primary vibrational modes of the mounted slider are in the 400 Hz to 6 kHz range, indicating a high degree of tracking stability. Ueda et al. (U.S. Pat. No. 5,630,948) primarily teaches a method of forming an integrated HGA and suspension wherein pairs of signal carrying conducting lines are integrated within the entire structure. Ueda's flexure is H-shaped and, being over-constrained, is inherently stiff. The method of Ueda is indicated as being advantageous for carrying "any suitable head by any desired means" (column 3, lines 15-16), but the flexure design indicated in the associated figure is significantly different from that shown in Khan et al. in that Khan's flexure is M-shaped. In addition, in Ueda there is neither instruction nor analysis on the optimal location of crossbars connecting the slider to slender, long, flexible strips. Erpelding et al. (U.S. Pat. No. 6,351,348) teaches a suspension system in which the positioning of the conducting leads and their ability to move through strategically positioned slots allows them to not contribute disadvantageously to the stiffness of the flexure arm. Ohwe et al. (U.S. Pat. No. 6,560,073) also teaches a flexure with a transverse cross beam extending from a pair of cross beams formed along opposite sides of the flexure. A central portion of the flexure, on which the slider is mounted, is supported by the transverse cross-beam. This flexure is very similar to that of Ueda, cited above.

The surface of the disk is not perfectly flat. It has texture, waviness and asperity. The slider fly height is also not constant. It is subject to variations due to ambient air pressure, shocks, wind excitations, disk topography and track accessing. Therefore, intermittent contact between the slider and the disk surface (the "head disk interface" interaction or HDI) does occasionally occur. The frequency and the intensity of such HDI increases with decreasing nominal fly height. Shimizu et al. (U.S. Pat. No. 5,659,448) teach a method of reducing the variations in slider fly height and of thereby reducing slider positioning error, by a method of affixing the slider to the gimbal using a small spacer, thereby reducing the amount of warpage in the gimbal that is transmitted by the motion of the slider. It has also been noted in the prior art that assembly errors also lead to poor slider performance and to general unreliability of the disk assembly. Ohwe et al. (U.S. Patent Application Publication No. U.S. 2005/0083610 A1) teach a magnetic head supporting system in which a gimbal assembly includes pairs of supporting beams, producing a more stable fly height.

HDI events cause wear to both the slider and the disk surface, creating debris and eventually leading to catastrophic failure, the "head crash." While this is clearly undesirable, advances in slider and disk surface tribology (study of frictional interactions) have significantly delayed the occurrence of head crashes. The slider-disk interface is now sufficiently durable to permit relatively intense HDI. In this regard, Boutaghou et al. (U.S. Pat. No. 6,392,842) teach the fabrication of a low friction surface slider that is capable of operation at ultra-low flying heights. In accord with such developments relating to improvements in the slider itself, the nominal fly height is being reduced in pursuit of high data recording density. However, this attempt is hampered by a new challenge, fly height modulation. Unlike the catastrophic head crashes that reduce the useful lifetimes of disk drives, excessive modulation renders a disk drive inoperable as soon as it is built. It is commonly understood that extensive HDI transfers kinetic energy from the rapidly rotating disk to a nominally stationary slider. Vertical vibration of the slider affects fly height and, therefore, affects the ability to record on and retrieve data from an intended track. Radial vibration of the slider causes the read/write transducer to record data on and retrieve data from tracks that are adjacent to the target track, creating irrecoverable (hard) and recoverable (soft) errors, respectively.

Much effort has been given by the magnetic recording industry to the improvement of slider ABS design, in order to improve the air bearing stiffness and damping. The prevailing theory is that slider movement in response to HDI should be minimized. By stiffening the air bearing interaction, the slider can better maintain its fly height during HDI. By improving damping, the slider fly height can be better recovered after each HDI event. This approach has been unsuccessful, however, in reducing fly height modulation at near-contact conditions.

The present inventors have discovered that fly height modulation associated with HDI is strongly influenced by high frequency (above 50 kHz) vibrations of the flexure. Specifically, this is because the flexure affects kinetic energy transfer between the disk and HGA during HDI. The flexure can store a significant amount of kinetic energy, thereby reducing the damping coefficient of the air bearing resonance. In view of this connection, there is a need for a flexure that transfers and stores minimal amounts of kinetic energy during and after HDI, therefore minimizing the fly height modulation at near-contact conditions.

The present invention teaches a flexure system design that has distinct advantages over designs within the prior art cited above. The objects of the present invention and the means of achieving those objects will be presented below.

SUMMARY OF THE INVENTION

The first object of the present invention is to provide a flexure support system for a slider mounted read/write transducer that is optimized for dynamic response to HDI events.

The second object of the present invention is to provide such a dynamically optimized flexure system that does not degrade such static slider properties as stiffness in response to pitch, roll and radial motion.

The third object of the present invention is to provide a flexure mounted and supported slider with a minimized impedance to pitch motion, thereby allowing the slider to pass smoothly over disk asperities.

The fourth object of the present invention is to provide such a flexure mounted and supported slider wherein the intensity of slider-disk impact is minimized.

The fifth object of the present invention is to provide such a flexure mounted and supported slider wherein wear on both slider and disk surfaces during disk drive operation is minimized.

The sixth object of the present invention is to provide such a flexure mounted and supported slider wherein energy transfer between the spinning disk and the HGA is minimized.

The seventh object of the present invention is to provide such a flexure mounted and supported slider wherein slider fly height can be effectively maintained through damping and wherein the damping is sufficiently rapid that the margin of clearance between slider and disk surface can be increased (e.g. a given HDI event will not induce an immediately subsequent HDI event).

The eighth object of the present invention is to provide such a flexure mounted and supported slider wherein read-back signal modulation is reduced.

The ninth object of the present invention is to provide such a flexure mounted slider in which electrical transmission lines are an integral part of the flexure design.

The objects of this invention will be achieved by a novel flexure system that, in a first embodiment (FIGS. 1a-1e) is schematically illustrated in an underneath view (looking up from a disk surface towards the ABS of the slider, when it is mounted). FIGS. 5a and 5b will illustrate additional embodiments of the flexure system. Summarized briefly, the flexure system includes the flexure portion itself (a flexible, patterned metal portion, that will just be called the "flexure" herein) that, when the entire system is complete, will be mounted to a load beam. A layer of insulation is formed on the flexure, a patterned set of conducting traces are formed on the layer of insulation, additional grounding layers, formed of static-electric dissipating material, may be formed on the traces, an insulating cover layer is formed over the traces and whatever additional grounding material is present and a slider is then secured to the flexure system over the cover layer. The flexure itself (as will be shown in FIG. 1a) includes a base portion, that is the portion finally fastened (by spot welds or other adhesive methods) to the load beam when the system is completely fabricated, outrigger portions that extend distally from the base portion, a pair of crossbars that are transverse to the distal ends of the outriggers and a slider bonding pad formed substantially at the mid-portion of the crossbars. The slider is mounted on the bonding pad (but insulated from it) and positioned so that its center of percussion is directly below the axis of the crossbars. Since the crossbars are very close to the center of percussion of the slider, they will twist but not translate, thereby minimizing the transfer of energy to the system during HDI events. The minimization of this energy will allow the slider motion to be stabilized and will increase the margin of clearance between the ABS of the slider and the disk surface.

BRIEF DESCRIPTION OF THE DRAWINGS

The objects, features, and advantages of the present invention are understood within the context of the Description of the Preferred Embodiment as set forth below. The Description of the Preferred Embodiment is understood within the context of the accompanying figures, wherein.

DESCRIPTION OF THE PREFERRED EMBODIMENTS

Each preferred embodiment of the present invention is a novel flexure system and a slider mounted thereon. The slider is mounted on a bonding pad along the axis of a transverse crossbar that is highly compliant in a pitch direction, the axis passing through the bonding pad and being directly above the center of percussion of the slider. The mechanical properties of the flexure system and the position at which the slider is mounted, minimizes energy transfer to, and storage within, the slider and thereupon within the associated head-gimbals assembly (HGA) during HDI events.

Figure 1A:
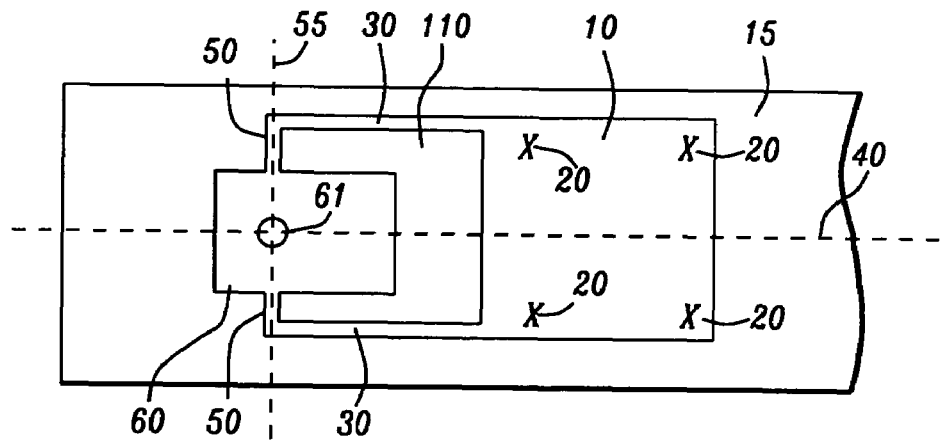
FIGS. 1a-1e schematically illustrate the fabrication of a first embodiment of the flexure system of the present invention, as viewed upward from a disk.

Referring first to FIG. 1a, there is shown schematically an underside view (looking up from the disk surface) of the flexure of a first embodiment of the flexure system. When completely assembled, the system will include a mounted slider, several layers of insulation, possible additional charge dissipating layers, electrical traces (signal carrying conducting lines), the flexure shown in the figure and the load beam to which the assembled elements are affixed.

The flexure, illustrated in this figure, is a patterned, integral construction formed of a rigid yet flexible material such as stainless steel. For example, a sheet of stainless steel between approximately 15 and 20 microns in thickness will meet the objects of the invention when formed as described below. The completed flexure will then be flexible for all motions out of its plane, as required to meet those objects. It is to be noted that the geometrical layout of the flexure, particularly the shape of the outriggers and crossbars, is designed to accommodate the subsequently formed electrically conducting traces. The patterning of the flexure is advantageously produced by etching.

The traces not only provide the electrical connections between the slider and external circuitry, but, together with the mechanical structure of the flexure components, they produce the mechanical behavior of the flexure system that achieves the objects of the present invention. In short, the traces are not put on as an afterthought, they are designed into the geometrical and mechanical structure of the entire system.

The flexure includes a base portion (10), approximately 4 mm or less in width, that, upon completion of the system, will be firmly attached to a longitudinally symmetric load beam (15) by spot welds (20), epoxy or other rigid fastening methods known in the art. These attachments will be shown schematically in a side view presented in FIG. 2. Two outrigger members (30), typically approximately 0.1 mm or wider, extend longitudinally from the substantially parallel lateral sides of the base portion and parallel to the load beam longitudinal symmetry axis (40). Two crossbars (50), approximately 0.1 mm or wider and having low twist stiffness, sharing a common transverse axis (55), each extend transversely between the distal ends of the outriggers. A slider bonding pad (60) to which the slider will be affixed (fastened), forms an extension of the crossbars and is integral with the crossbars and will support the slider. In this embodiment, the bonding pad extends with longitudinal symmetry from the crossbars and there is a small opening (61) in the bonding pad that will allow direct contact between the slider and a "dimple" protruding from the load beam and acting as a pivot point, as shown in FIG. 2. The bonding pad need not be longitudinally symmetric about the transverse direction of the crossbar and it may also be formed without such an opening, in which case the dimple will contact the back of the pad itself. The crossbars (50) are highly compliant to twisting in a pitch direction (twisting about their common transverse axis), and the outriggers are compliant to bending in the same direction, thereby allowing the slider to pass over irregularities in the disk surface without producing excessive motion in the load bar. Nevertheless, as will be discussed below, the mounting position of the slider will minimize energy transfer to the flexure during HDI events. The shape of the flexure defines a cavity (110) behind the mounting pad, the cavity being bounded by the base, the outriggers, the bonding pad and crossbars. The flexure may also contain variously shaped and located openings to decrease stiffness, if necessary, but the completed flexure system, as a whole, should be electrically conducting so as to allow grounding of the system and to prevent ESD damage during construction and operation.

In the following figures, the successive elements forming the flexure system are shown as being successively formed beneath the flexure, in a direction towards the disk surface (if a disk were present). In actual practice, the flexure would be a bottom layer and these additional elements would be formed over it, in the upward direction. The completed fabrication (the flexure system) would then be inverted and mounted beneath the load bar, as shown in either FIG. 2a or FIG. 2b.

Figure 1B:
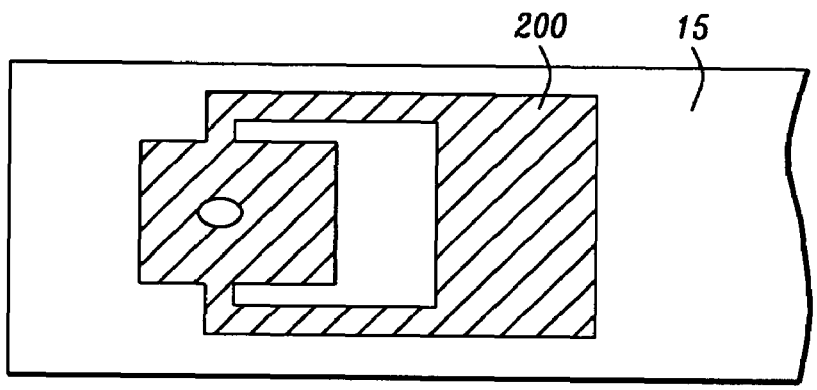

Referring next to FIG. 1b, there is shown, schematically, the flexure of FIG. 1a, on which has now been formed a first layer of insulation (200). This layer is preferably a polyimide strip, approximately 5 microns in thickness, that is laminated onto the flexure portion, substantially covering the entire flexure portion surface, but leaving opening (61) uncovered. The formation of this layer of insulation is the first step in the lamination of conducting traces onto the flexure system in a way that integrates the traces with the flexure system and contributes to both its mechanical and electrical performance.

Figure 1C:
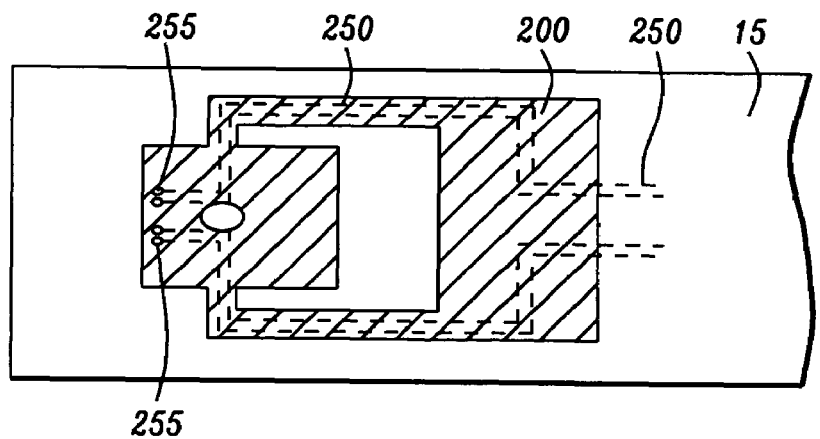

Referring next to FIG. 1c, there is shown, schematically, the fabrication of FIG. 1b wherein a patterned set of conducting traces (250) has been formed symmetrically about the longitudinal axis of the flexure portion over the first layer of insulation. The traces are deposited directly onto the insulation (200), without the use of adhesive. For example, a patterned layer of copper may be first deposited by vacuum deposition, then the layer may be further built up by a plating process. Alternatively, a covering layer of copper may be formed and then patterned by etching to remove unwanted portions. The traces will typically be at least partially covered by an insulating overlayer, (shown in the following figure) such as a 5 micron thick layer of polyimide, to insulate them from the underside of the slider and to protect the traces from mechanical and/or electrical damage during the assembly, shipping and testing procedures. The traces may also be partially covered by a static-charge dissipating layer. The traces advantageously follow the outline of the crossbars, outriggers and base portions of the flexure and extend rearward therefrom to external circuitry (not shown). The traces terminate distally (over the slider bonding pad) in contacts (255) that allow electrical connections to be made to corresponding contacts on the trailing edge of the slider using methods such as gold-ball bonding or solder ball bonding (not shown). As has already been noted and will be further noted, the routing of the traces over the flexure contributes to the overall mechanical performance of the flexure and to meeting the objects of the invention. It is a further aspect of the invention that an additional grounding layer may be formed partially about the traces to help dissipate static charges during assembly and use of the system. This layer is formed of a material whose resistivity is intermediate between a conductive and an insulating material and its presence will not adversely affect the stiffness properties of the flexure.

Figure 1D:
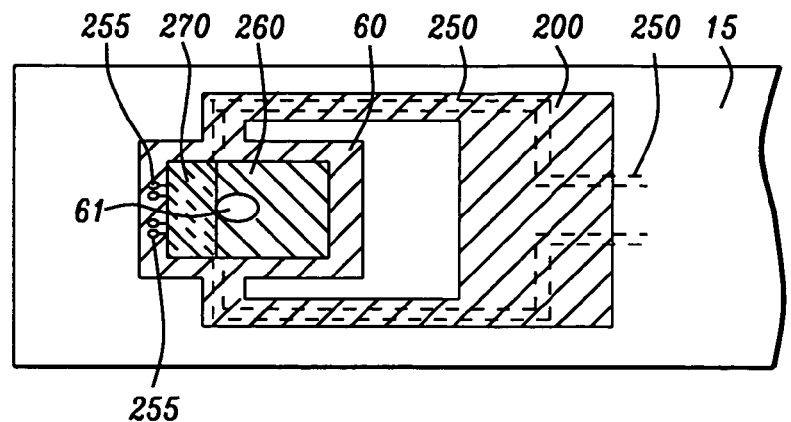

Referring next to FIG. 1d, there is shown, schematically, the fabrication of FIG. 1c wherein a second cover layer of insulation (260), typically a polyimide layer approximately 5 microns thick, has been formed over at least a portion of the traces to provide insulation where the traces may later be in contact with other conductors during manufacture and application. For simplicity, the insulation is shown here as a rectangular layer over the bonding pad. However, insulation (260) would also be needed where another layer (270) of intermediate conductivity will be deposited as a ground plane. In this respect, as noted above, it is a further aspect of the present invention that, for grounding purposes, the traces may be further covered by such a thin layer (270) of electrostatically dissipative material, i.e., material of intermediate electrical resistivity, typically between $10^7$ and $10^9$ ohm cm. Such a grounding layer is of negligible thickness so it does not contribute substantially to the thickness of the traces, thereby ensuring flexibility of the flexure system for all out-of-plane motions. The grounding layer (270) is here indicated highly schematically as being formed over the portion of the traces that is beneath the insulation (260).

Insulation (260) may also be applied where the traces may be exposed to assembly tools in the manufacture of disk drives. Also, insulation (260) is applied over the distal ends of the traces to prevent the traces from contacting the conductive slider substrate and causing an electrical short circuit. However, the contacts (255) of the traces must remain exposed for final connection to the slider. As is known in the art, insulation (260) may be patterned on the slider bonding pad (60) as standoffs and epoxy retaining walls to facilitate the attachment of the slider onto the flexure system, a process known in the art as "potting."

Figure 1E:
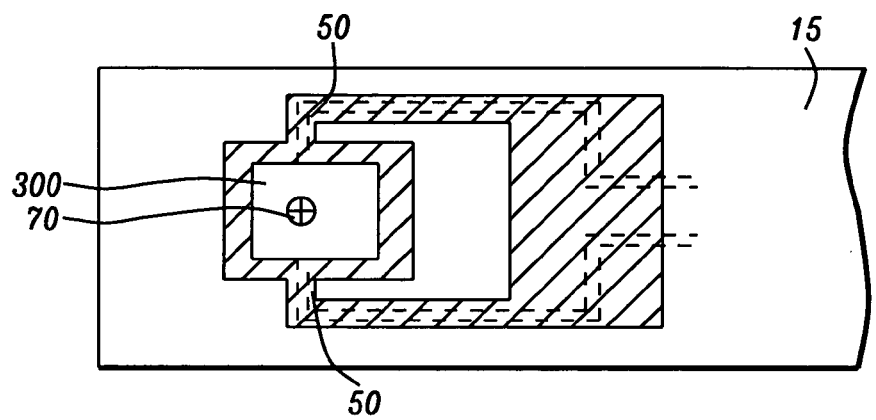

Referring next to FIG. 1e, there is shown, schematically, the fabrication of FIG. 1d wherein a slider (300) has been positioned over the second layer of insulation (260) on the slider bonding pad (60), allowing the formation of electrical connections to the exposed trace contacts ((255) in FIG. 1d) at its trailing edge. The slider is positioned on the bonding pad and affixed to it so that its center of percussion (70) (shown as an encircled cross) as will be discussed below, is substantially directly vertically below the point of affixation to the bonding pad. This point of affixation to the bonding pad is typically substantially along the transverse axis of the crossbars. Although several shapes of the bonding pad will meet the objects of the invention (see FIGS. 5a-5b), in each case the slider is fastened to the pad so that its center of percussion is substantially directly vertically below the point of fastening (affixation) and below the common axis of the crossbars where the axis passes through the bonding pad.

Figure 2A:
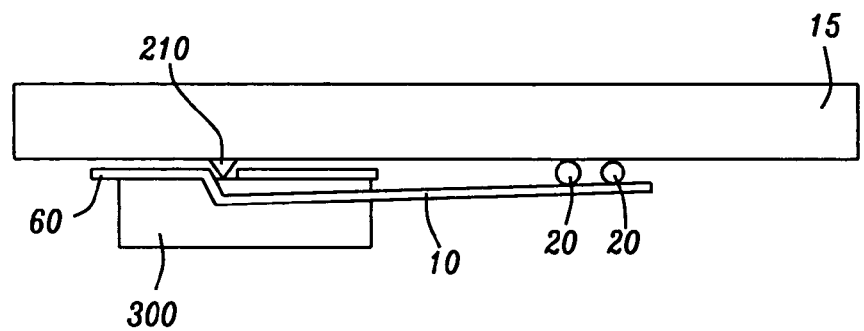
FIGS. 2a-2b shows schematic side views of (a) the embodiment represented by the completed fabrication of FIGS. 1a-1e and (b) of another embodiment in which the flexure contacts the load beam differently.

Referring then to FIG. 2a, there is shown in a schematic side view the complete fabrication of FIG. 1e, where the mode of fastening the flexure base (10) to the load beam (15) by (for example) welds (20) can be clearly seen. Note that, typically, these are spot welds and have negligible thickness; the small circles (20) exaggerate the dimensions of the welds for clarity. A small protrusion or "dimple" (210) extends downward from the load beam and (in this embodiment) directly contacts the upper surface of the slider (300) through a small opening ((61) in FIG. 1a) formed in the slider bonding pad of the flexure. The dimple acts as a pivot point for slider motions and it need not contact the slider directly to accomplish this object. As will be explained below, the dimple may either contact the slider directly (as shown in this figure), or, in alternative embodiments that include flexures having differently shaped bonding pads, it may contact the flexure. In either case (as discussed in connection with FIG. 3) the contact is at a point that is vertically below the effective point mass of the load beam and vertically above the center of mass of the slider. The form of direct dimple-to-slider contact shown in this figure is viable because the height of the dimple typically exceeds 50 microns, whereas the flexure thickness can be less than 40 microns. In addition, the flexure is shown slightly bent ("formed") in this figure, with the bonding pad (60) vertically offset from the base (10) of the flexure, but it can also be free of forming (see FIG. 2b), without loss of the advantages of the invention. As will be indicated in FIGS. 5a-5b, other shapes of the flexure produce direct contact between the dimple and the slider mounting pad rather than the dimple-to-slider contact.

The direct contact between the dimple and the slider back surface, as shown in this figure, has the advantage of reducing the distance between the dimple tip and the slider ABS (this distance being essentially the slider thickness). Since this distance represents a moment arm (or lever arm) for the (negative) torque produced by the frictional force on the ABS caused by hydrodynamic flow, it will reduce this torque and, correspondingly, make the system more stable. On the other hand, an embodiment in which the dimple contacts the back surface of the flexure, rather than passing through the cavity in the slider mounting pad to contact the slider, is easier to manufacture.

Figure 2B:
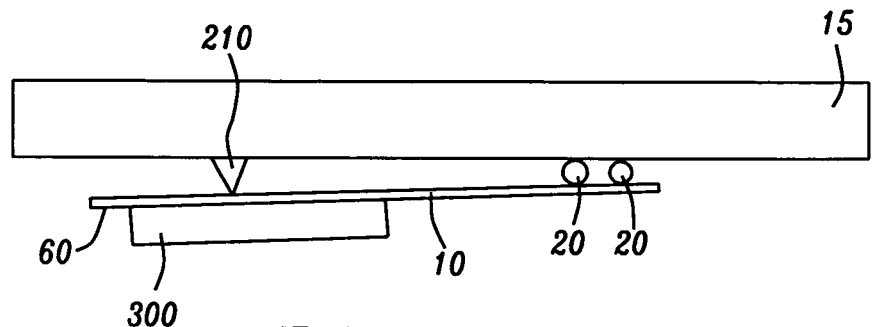

Referring next to FIG. 2b, there is shown a side view of an alternative embodiment of the flexure system described in FIG. 2a, which differs from the system in FIG. 2a in two respects only: 1) the flexure is not offset by forming as in FIG. 2a, but is substantially planar (except for slight curvature produced by the mounting) and, 2) the dimple (210) contacts the back of the slider bonding pad (60) instead of the slider itself. Elimination of the offset, which is possible when the center of percussion of the slider is close to the slider backside surface, simplifies the manufacturing process of the flexure system.

Figure 3:
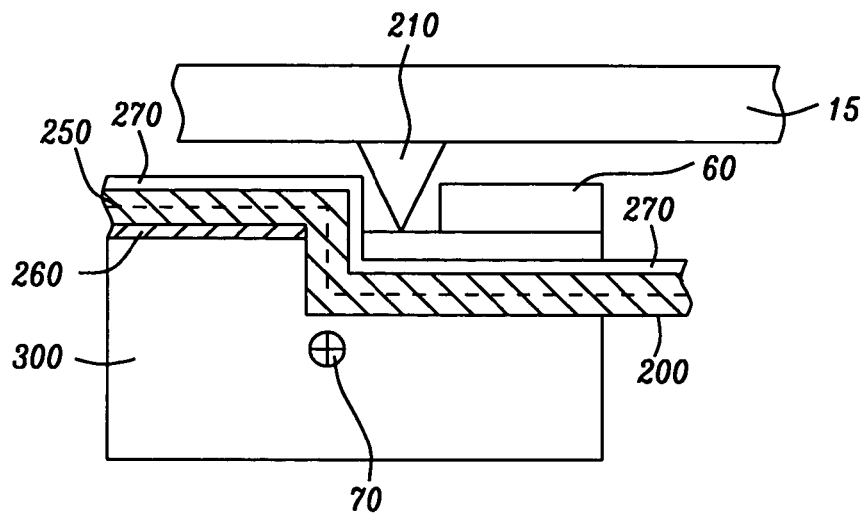
FIG. 3 is a schematic detail of a possible routing of conducting traces between the slider and the flexure of the present invention.

Referring to FIG. 3, there is shown a schematic detailed view of the flexure system in FIG. 2a, showing the possible routing of conducting leads (traces) (250) from the connecting terminals on the slider (not shown) rearward along the direction of the load beam (15). At least a portion of the traces may be supported by a thin, electrostatically dissipative grounding layer (270), such as a layer of material having an intermediate resistivity, running along an upper surface of the traces. This layer may be used to provide a ground plane for the traces, which is often needed for ESD (electrostatic discharge) control and cross-talk reduction. The layer may also slightly stiffen the traces, but any additional stiffness should not alter the flexibility of the crossbars or outriggers to make out-of-plane motions. When the fabrication is complete, in the sense of FIGS. 1a-1e, the traces will be positioned substantially between a layer of insulation (200) on which they are formed (see FIG. 1c) and a layer of insulation (260), (see FIG. 1d), formed between them and the slider, to avoid shorting through the slider substrate.

Figure 4:
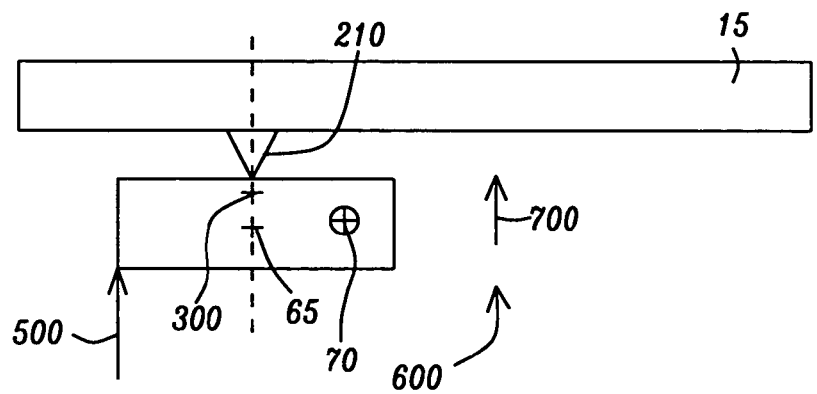
FIG. 4 shows a schematic side view of a slider and load beam to illustrate a mechanical model of the invention.

Referring to FIG. 4, an understanding of the advantageous behavior of the present invention can be gained from the following discussion of a simple mechanical model of the slider and flexure. Note that the illustration of this model may not coincide exactly with side views of the embodiment shown in FIG. 2a-2b.

The slider, together with the inertia of all material rigidly attached to the slider, can be treated as a rigid mass with a centrally located center of mass, shown as a cross (65). Most HDI events are mild enough that there is no slippage at the dimple contact between the slider and load beam. Thus, the effective mass of the load beam in such HDI events can be treated as a point mass, shown as a cross (300) attached to the slider at the point of dimple contact along a vertical line through the dimple (210). The slider has a center of percussion located at (70), shown as a circled cross, which, in achieving the objects of this invention, will be located below its point of attachment to the flexure, which is at the axis of the flexure crossbar. The flexure axis is not shown in this drawing of the mechanical model. The air bearing layer can be treated as a massless spring (not shown) that extends from the hard disk (not shown) to the underside (ABS) of the slider.

An HDI event generates an impulse (arrow (500)) that is usually at the trailing edge of the slider. The impulse produces a combination of a rotation (arrow (600)) and a vertical translation (arrow (700)). The center of percussion (70), by definition, will exhibit no translation.

A flexure attached to the slider (not shown in this figure) will be vibrationally excited in any of several possible mechanical modes by the slider's response to the HDI. In particular, the portion of the flexure that is attached to the slider will be excited by the motion of the slider. For example, a wave (or oscillatory motion) can be generated in the flexure by either translation or rotation of the region of slider attachment. Since the slider is a rigid body, its rotation will be uniform. However, the translation of the slider depends on the point of its attachment to the flexure. By aligning the point of slider attachment with the center of percussion of the slider (which does not translate), the energy transferred to the flexure is minimized.

While the slider-end of the flexure will be excited, the base of the flexure, rigidly attached to the massive load beam, remains stationary. The energy stored in the flexure depends on the mode of vibration. At any given point (or cross-section) of the flexure, the energy stored in the flexure is proportional to the square of the local amplitude of the vibrational mode or modes excited. To minimize the stored energy in the entire flexure, the mode shape should be optimized to minimize the root-mean-square of the local amplitude, assuming the flexure is uniform. If the flexure is not uniform, the root-mean-square of local amplitude weighted by the local density should be minimized.

A flexure of the present invention, as described above, typically consists of segments that are perpendicular to each other (see FIG. 1a). The flexure crossbar is the flexible member aligned with the axis of percussion of the slider. Segments or members in the slider-length (longitudinal) direction are called outriggers. The crossbar, being above the non-translating center of percussion of the slider, only experiences twisting modes of vibration. The outriggers experience bending modes, which also results in translation. Both the crossbars and the outriggers contribute to the compliance of the flexure in the pitch direction, which is required in order to accommodate HDI events. However, the crossbars require less energy than the outriggers to contribute to pitch compliance.

As a result of this analysis, it can be seen that it is desirable to maximize the crossbar twist compliance, since that member can take on the bulk of the responsibility for responding to pitch induced by HDI events while requiring less energy to do so. An examination of the prior art cited above shows that they would not meet the objects of the present invention. For example, Villette, cited above, utilizes two pairs of crossbars. One pair is aligned with the trailing end of the slider and is therefore subject to translation. Another pair seems close to the center of percussion (although does not seem to be designed to meet that object). However, this pair of crossbars is attached to a flexible ring, which is in turn connected to both extremities of the slider. When the slider is subjected to an impulse, the ring vibrates. Therefore, this pair of crossbars, despite its proximity to the center of percussion, is not immune to translational vibration. King (cited above) shows three groups of crossbars. Two of them (the middle pair) are aligned to the center of mass, but not the center of percussion of the slider. This pair is again too short and stiff Similarly, the crossbars shown and described in Levy, Ueda and Shimizu (each discussed above) are too short and stiff. Furthermore, flexure in most of the prior art cited above consists of substantial amounts of vibrating mass on the twist-only crossbars.

In most of the prior arts, electrical transmission lines (traces) are either omitted entirely or assumed to contribute negligible stiffness to the flexure. Therefore, the flexure was designed purely on the basis of mechanical considerations. The transmission lines were added to the flexure afterwards. However, in state-of-the-art flexures, transmission lines contribute significantly to both static pitch and static roll stiffness. The contribution of these lines to flexure vibrational energy may match or even exceed that of the stainless steel portion of the flexure. In the present invention, the transmission lines (traces) are designed as an integral part of the mechanical structure. As indicated in FIGS. 1a-d, the outriggers and crossbars are laid out first to accomplish the routing of electrical connections, then they are shielded by one or more insulating layers and, in addition, electrical ground layer(s) may be formed as needed (shown, for example, in FIG. 3). The conducting traces are then laid out over the outriggers and crossbars. Accordingly, the outriggers and crossbars always include a plurality of electrical transmission lines and insulations that contribute to their mechanical behavior. Stainless steel or other stiff material may be either absent, present with holes (relieves), or present as contiguous layers. For example, as shown in FIGS. 1a-1d, the flexure may be formed as a laminated sheet comprising at least a 15-20 micron thick sheet of stainless steel, a polyimide first layer of insulation that serves as an under-layer, copper traces, (optionally) a negligibly thick grounding layer and at least a 5 micron thick second layer of polyimide (for example) insulation that serves as a cover layer. The stainless steel layer may include holes (windows) for density and stiffness reduction. However, it is desirable that the stainless steel layer remains electrically continuous for ease of grounding, which, along with the grounding layer, permits the prevention of ESD damage during assembly. The polyimide under-layer is required to isolate the copper traces (and grounding layer, if present) from the slider substrate, and to protect the copper traces from external objects during assembly. To reduce capacitance between the traces and between the traces and ground, both the under-layer and the cover-layer may be omitted or reduced to a grid pattern, when isolation will not be jeopardized.

It should be further pointed out that, due to friction, the HDI impulse is not necessarily perpendicular to the disk surface. The center of percussion of the slider, as used in the description of this invention, is the center of percussion of the slider together with the included effective mass of attached material such as a portion of the flexure. The effective mass of attached elastic material is difficult to estimate without the aid of a digital computer. However, with many commercially available numerical simulation programs, such as ANSYS, the true center of percussion can be easily identified. It is the axis that is free of translations in response to an HDI impulse.

Figure 5A:
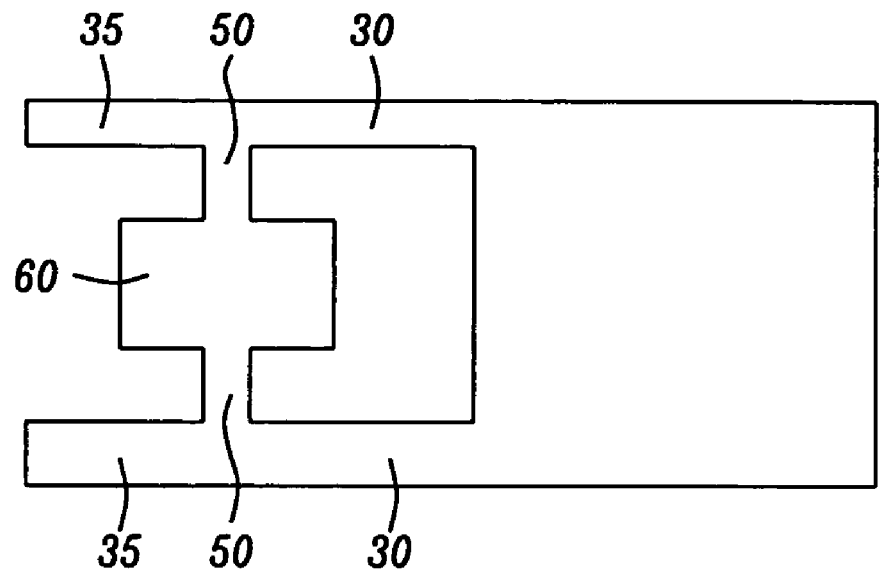
FIGS. 5a-5b show schematic views of two different flexure shapes corresponding to additional embodiments of the present invention.

Referring to FIG. 5a, there is shown a flexure that represents an alternative embodiment of the present invention. After one or more HDI impulses, the flexure vibrational mode becomes a persistent standing wave. Thus, the slider is subject to a periodic force that causes fly height modulation that may, in turn, lead to additional HDI events. To reduce the periodic force on the slider, the flexure outriggers (30) may be extended (35) distally beyond the crossbars (50) and bonding pad (60), which has no central opening in this drawing but which may have such an opening as well. The extensions (35) resemble dynamic absorbers that act to suppress particular vibrational frequencies, but they operate on a different principle of "end resonance." The length of the extensions (35) is nominally ¼ of the wavelength of the dominant mode(s) of vibration. Unlike dynamic absorbers, the extensions need not be precisely tuned to the frequency that is intended to be suppressed. The transverse width of these extensions may be similar to that of the outriggers. These extensions may also be used for other purposes, such as supporting the slider against shock when the slider is not being actively used and is positioned on a load/unload ramp within the disk drive. Although such ramps are known in the art, the use of vibrational suppressing extensions on the flexure to engage the ramp is not disclosed in the prior art.

Figure 5B:
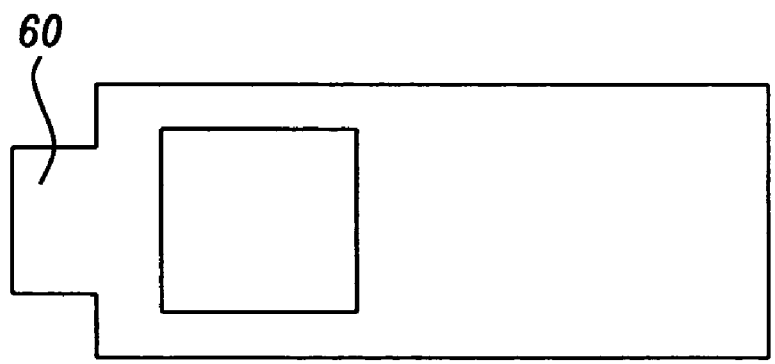

Referring to FIGS. 5b, there is shown a schematic drawing of yet another embodiment, a flexure having a bonding pad (60) with a geometrical shape different than that shown in either FIG. 1a or in FIG. 5a. This shape lacks an opening within the slider bonding pad (60), so the load bar dimple will contact the back of the flexure rather than the back surface of the slider. It is to be noted that various shapes of the slider bonding pad are possible, the two shown here being merely exemplary.

As is understood by a person skilled in the art, the preferred embodiments of the present invention are illustrative of the present invention rather than being limiting of the present invention. Revisions and modifications may be made to methods, processes, materials, structures, and dimensions through which is formed a flexure mounted slider of high pitch compliance and minimal transferred and stored energy during HDI events, while still providing such a flexure mounted slider, formed in accord with the present invention as defined by the appended claims.

What is claimed is:

1. A flexure mounted slider for use in a hard disk drive comprising:
    a load beam having a longitudinal axis of symmetry and a lower surface facing a hard disk;
    a flexure, affixed to the lower surface of said load beam, longitudinally aligned with said load beam and extending longitudinally along said load beam from said affixation, said flexure including a laterally separated, longitudinally extending pair of outriggers, a pair of crossbars formed on the distal ends of said outriggers, extending transversely to said outriggers and aligned along a common transverse axis that also passes through a slider bonding pad formed integrally with said crossbars, said crossbars being highly compliant to twisting in a pitch direction;
    a first layer of insulation formed on said flexure portion;
    a set of patterned electrically conducting traces formed on said first layer of insulation and routed along said flexure portion;
    a second layer of insulation formed at least partially over said traces;
    a slider, having a center of percussion and an ABS, positioned over said first layer of insulation and affixed to said bonding pad at a surface opposite said ABS, the center of percussion of said slider being substantially directly vertically below said point of affixation, which point is substantially along said transverse axis, and a longitudinal axis of symmetry of the slider being aligned with the longitudinal axis of symmetry of said load beam; and, wherein
    a protruding dimple formed on the underside of said load beam contacts said slider or contacts a point on said flexure above said slider.

2. The flexure mounted slider of claim 1 wherein the mounting of the slider so that its center of percussion is substantially directly vertically below its point of affixation to said flexure crossbars eliminates the transfer of translational motion to said flexure and thereby minimizes the transfer of energy to, and storage of energy in said flexure during HDI events.

3. The flexure mounted slider of claim 1 wherein the crossbars are highly compliant to twisting motions in a pitch direction and the outriggers are compliant to bending in said pitch direction, which allows said slider to pass over irregularities in a disk surface during normal operation.

4. The flexure mounted slider of claim 1 wherein said flexure further includes the following elements:
    a base portion whereat said flexure is affixed to said load beam, said base portion having lateral edges, said edges being aligned substantially longitudinally with said load beam;
    the two flexible outrigger elements extending distally from said lateral edges and aligned therewith;
    the two highly compliant twistable crossbars extending transversely from distal ends of said outrigger elements, said crossbars having substantially identical lengths and being aligned along a common transverse axis, the peripheral boundary formed by said base, said outriggers and said crossbars forming a cavity within said flexure; and
    a slider bonding pad centrally disposed on said crossbars and formed integrally therewith, said bonding pad providing a supporting region for affixing said slider to said flexure in a manner that allows the center of percussion of said slider to be below said affixation and substantially below the common transverse axis of said crossbars.

5. The flexure mounted slider of claim 4 wherein the elements comprising said flexure form a substantially common plane.

6. The flexure mounted slider of claim 4 wherein the crossbars and bonding pad are formed to produce an offset above the outriggers and base portion of the flexure.

7. The flexure mounted slider of claim 4 wherein said bonding pad extends substantially symmetrically across the transverse axis of said crossbars, or wherein said bonding pad extends only distally across the transverse axis of said crossbars.

8. The flexure mounted slider of claim 4 wherein said bonding pad includes an opening through which said dimple can contact the upper surface of said slider.

9. The flexure mounted slider of claim 4 wherein said outrigger portions include longitudinal extensions that extend distally beyond said crossbars forming, thereby, a mechanism for reducing vibratory forces on said slider.

10. The flexure mounted slider of claim 9 wherein the length of said extensions is approximately ¼ of the wavelength of the dominant vibrational mode.

11. The flexure mounted slider of claim 9 wherein said extended outrigger portions provide a mechanism for engaging a load/unload ramp that protects the slider from shock while it is not operative.

12. The flexure mounted slider of claim 4 further comprising:
a patterned, set of conducting traces, symmetrically placed about said longitudinal axis, said traces being formed on said first layer of insulation, the traces being routed along said outriggers, said crossbars, and said flexure base portion and the distal ends of said traces including bonding pads for making electrical connections to said slider;
a thin, flexible grounding layer formed of electrostatic charge-dissipating material partially covering said traces,
a second layer of insulation formed over said conducting traces and said flexible grounding layer, but leaving said bonding pads uncovered, whereby said traces, said grounding layer and said first and second layers of insulation contribute to the mechanical properties of said flexure.

13. The flexure mounted slider of claim 1 wherein said flexure is formed of stainless steel having a thickness between approximately 15 and 20 microns.

14. The flexure mounted slider of claim 1 wherein said outriggers and crossbars are at least approximately 0.1 mm wide and the overall width of said base portion is less than approximately 4 mm.

15. The flexure mounted slider of claim 1 wherein said first and second layers of insulation are layers of polyimide formed to a thickness of approximately 5 microns.

16. The flexure mounted slider of claim 1 wherein, for a slider of substantially uniform mass density, the kinetic energy transfer is minimized by minimizing the root-mean-square of the local vibrational amplitudes.

17. The flexure mounted slider of claim 1 wherein, for a slider of non-uniform mass density, the kinetic energy transfer is minimized by minimizing the root-mean-square of the product of local density and vibrational amplitudes.

18. The flexure mounted slider of claim 1 wherein the flexure is affixed to said load beam by spot welds or epoxy adhesive.

19. A method of fabricating a flexure mounted slider comprising:
providing a load beam having a longitudinal axis of symmetry;
affixing to said load beam, along its longitudinal axis, a longitudinally symmetric flexure having a base portion, laterally separated, longitudinally directed outrigger portions and a pair of crossbars formed along a common axis transverse to said outrigger portions, said crossbars being formed at the distal ends of said outrigger portions, said crossbars having formed thereon a slider bonding pad and said crossbars being highly compliant to twists in a pitch direction;
forming a first layer of insulation covering the surface of said flexure opposite to the surface of its affixation to said load bar;
forming a set of traces on said insulation layer, said traces being routed along said crossbars and said outrigger portions;
forming a second layer of insulation over said traces;
affixing a slider to said flexure at said bonding pad, the slider being supported by said bonding pad and said slider having a center of percussion that is substantially directly vertically below said point of affixation and substantially aligned with said transverse axis.

20. The method of claim 19 wherein the location of said center of percussion causes said slider to be free of translations in response to an HDI impulse.

21. The method of claim 19 wherein the location of said center of percussion is calculated using a mechanical model of said flexure mounted slider.

22. The method of claim 19 wherein the shape and mass distribution of said flexure mounted slider are optimized to minimize vibrational energy stored therein as a result of HDI events, said optimization being obtained by minimizing the product of the mass density of said flexure mounted slider and the squared amplitude of the dominant vibrational modes.

23. The method of claim 19 wherein said flexure is formed of stainless steel having a thickness between approximately 15 and 20 microns.

24. The method of claim 19 wherein said outriggers and crossbars are at least approximately 0.1 mm wide and the overall width of said base portion is less than approximately 4 mm.

25. The method of claim 19 wherein said first and second layers of insulation are layers of polyimide formed to a thickness of approximately 5 microns.

26. The method of claim 19 wherein, for a slider of substantially uniform mass density, the kinetic energy transfer is minimized by minimizing the root-mean-square of the local vibrational amplitudes.

27. The method of claim 19 wherein, for a slider of non-uniform mass density, the kinetic energy transfer is minimized by minimizing the root-mean-square of the product of local density and vibrational amplitudes.

28. The method of claim 19 wherein the flexure is affixed to said load beam by spot welds or epoxy adhesive.

29. The method of claim 19 further including the formation of a static electric charge dissipating layer formed between said traces and said second layer of insulation.

30. The method of claim 29 wherein said charge dissipating layer is formed of a material having an intermediate electrical resistivity between $10^7$ and $10^9$ ohm cm.

31. The method of claim 19 wherein said outrigger portions include longitudinal extensions that extend distally beyond said crossbars forming, thereby, a mechanism for reducing vibratory forces on said slider.

32. The method of claim 19 wherein the length of said extensions is approximately ¼ of the wavelength of the dominant vibrational mode.

33. The method of claim 19 wherein said extended outrigger portions provide a mechanism for engaging a load/unload ramp that protects the slider from shock while it is not operative.

34. The method of claim 19 wherein said traces are formed by plating a patterned conducting material on said first layer of insulation.

35. The method of claim 19 wherein said traces are formed by patterning a layer of conducting material formed over said first layer of insulation.

* * * * *